(12) United States Patent
Studer et al.

(10) Patent No.: US 7,903,330 B2
(45) Date of Patent: Mar. 8, 2011

(54) MICROSCOPE HAVING A SENSOR OPERATING IN NON-CONTACT FASHION

(75) Inventors: Heinz Studer, Blons (AT); Ewald Hiller, Dornbirn (AT)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 11/955,422

(22) Filed: Dec. 13, 2007

(65) Prior Publication Data

US 2008/0144168 A1     Jun. 19, 2008

(30) Foreign Application Priority Data

Dec. 14, 2006   (DE) .................. 10 2006 058 943

(51) Int. Cl.
*G02B 21/00*   (2006.01)
(52) U.S. Cl. ........................... 359/380; 359/368
(58) Field of Classification Search .......... 359/368–393
See application file for complete search history.

(56) References Cited

U.S. PATENT DOCUMENTS

| | | | |
|---|---|---|---|
| 5,517,353 A * | 5/1996 | Ikoh et al. .................. 359/388 |
| 5,867,310 A | 2/1999 | Hasegawa | |
| 6,989,928 B2 * | 1/2006 | Kawanabe et al. ........ 359/392 |
| 7,068,426 B2 | 6/2006 | Bruehl et al. | |
| 2004/0252279 A1 | 12/2004 | Koschmieder et al. | |
| 2005/0111086 A1 | 5/2005 | Knoblich et al. | |
| 2007/0019288 A1 | 1/2007 | Karasawa | |

FOREIGN PATENT DOCUMENTS

DE    19822256 C2   12/1999
JP     9325280 A1   12/1997

OTHER PUBLICATIONS

AustriaMicroSystems, AS5045 12 Bit Programmable Magnetic Rotary Encoder Data Sheet, Revision 1.1, Feb. 24, 2005.
Lin, David, "Den Dreh raus für geradeaus", ElektronikPraxis No. 12, Jun. 16, 2006, p. 26 et seq., Germany.

* cited by examiner

*Primary Examiner* — Thong Nguyen
(74) *Attorney, Agent, or Firm* — Hodgson Russ LLP

(57) ABSTRACT

A microscope having a mechanically adjustable zoom system (7) and/or a mechanically adjustable focus system is described, which microscope is equipped at least one manually movable adjusting element (2) for adjusting the zoom system (7) and/or the focus system. The adjusting element (2) has associated with it a sensor (1) for ascertaining and/or indicating the position of the adjusting element (2).

15 Claims, 2 Drawing Sheets

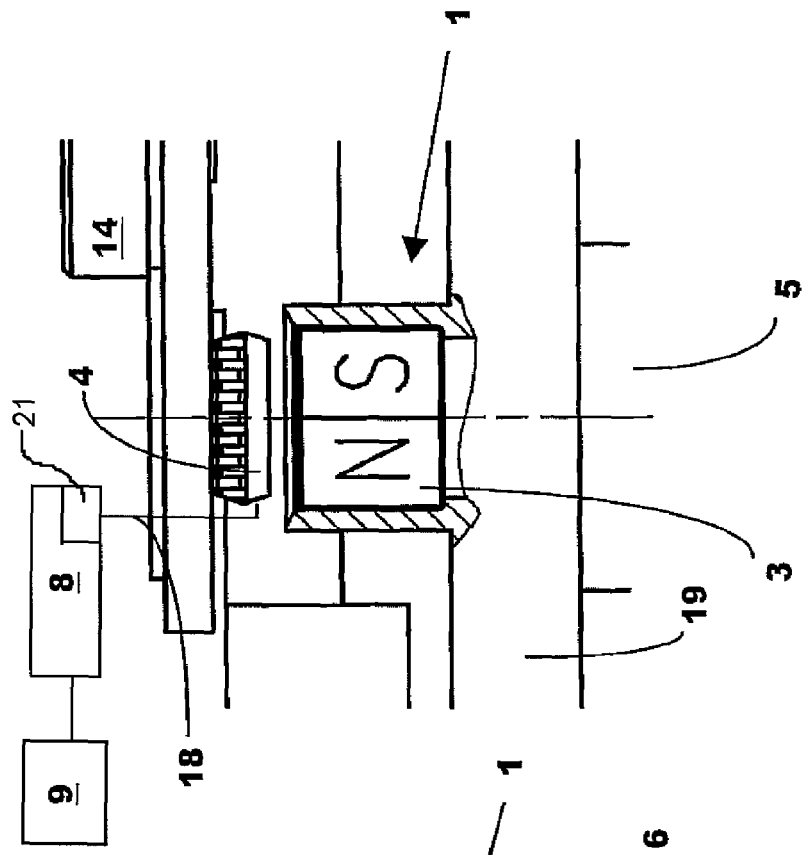
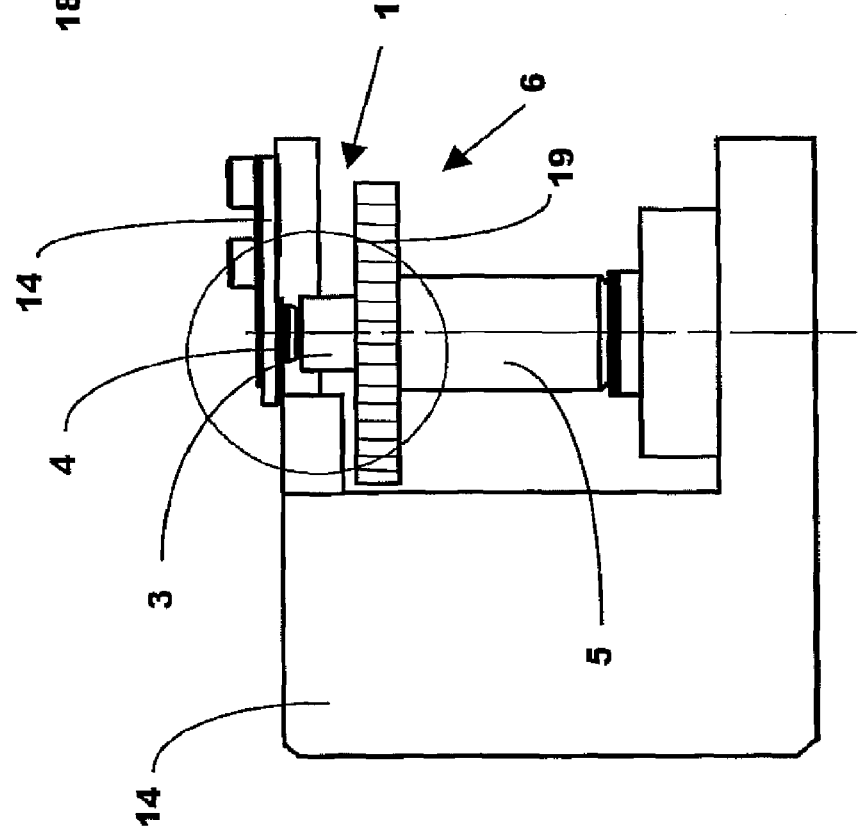

MICROSCOPE HAVING A SENSOR OPERATING IN NON-CONTACT FASHION

CROSS REFERENCE TO RELATED APPLICATIONS

This application claims priority of German patent application 10 2006 058 943.2 filed Dec. 14, 2006, which application is incorporated by reference herein.

FIELD OF THE INVENTION

The invention relates to a microscope having at least one manually movable adjusting element, such as an adjusting element for adjusting a zoom system and/or a focus system of the microscope.

BACKGROUND OF THE INVENTION

In microscopes of this kind it is usual that, for example, the focus or a zoom system be manually modified or adjusted. For this purpose, these components are mechanically connected to an adjusting knob. Other manually movable adjusting elements in the microscope are, for example, the objective turret or a filter slider, a filter turret, or also an adjustable stop, which either are actuated directly or have an adjusting wheel associated with them. These microscopes are notable for the fact that they are of simple construction and can be offered at a correspondingly low price.

In contrast thereto, microscopes are known in which the modifiable adjusting elements in the microscope are actuated with stepping motors or DC motors. With such drive systems it is usually necessary for these motors to be equipped with incremental encoders and corresponding control systems. With these complex measures it is then, of course, possible to perform the corresponding adjustments automatically, and additionally to use for measurement purposes the values or variables that are set. Certain settings on the microscope, for example the zoom position or magnification, the working distance to the specimen, or also the objective in use, can then also be repeatably stored or documented.

Microscopes of corresponding construction are known from the documents DE 103 55 529 A1, DE 102 25 193 B4, and DE 198 22 256 C2. The microscopes and control devices described therein are notable for the fact that essential microscope functions are embodied to be modifiable in electrically motorized fashion, and the position can be controlled reproducibly via rotary encoders. The use of electric motors in a microscope of course requires a precisely operating control device, and is therefore quite complex.

SUMMARY OF THE INVENTION

It is therefore an object of the present invention to refine a manually operated microscope in such a way that it can also be used for measurement purposes, and that the microscope parameters, once adjusted, can be set repeatably.

This object is achieved by the present invention, and advantageous refinements of the invention are described herein.

The invention is notable for the fact that a manually operated microscope of simple construction, having a mechanically adjustable zoom system and/or having a mechanically adjustable focus system, is equipped with a sensor, and the position of an element of the zoom system or the focus system that is to be adjusted manually in the microscope is ascertained with said sensor.

In an advantageous embodiment of the invention, the sensor is embodied as an absolute-measuring sensor operating in non-contact fashion, so that no initialization of the sensor after a shutoff of current delivery is necessary. In contrast to incremental encoders or stepping motors, no initializations need to be performed in this case.

In a further embodiment of the invention, the sensor is equipped with a magnet and with a receiver, the change in the magnetic field being sensed by way of a relative motion between the magnet and the receiver. Either the magnet or the receiver is mounted on the movable adjusting element of the microscope.

In a further embodiment of the invention, provision is made that the sensor is embodied as a Hall effect sensor. With a sensor of this kind, a magnet is moved in non-contact fashion over a receiver module, and the field strength of the magnetic field is measured by the receiver. The distance from the receiver at which the magnet is arranged is immaterial in this context, so that tolerances in the mechanical guidance system of the moving magnet do not result in a distorted measurement result.

In a particular embodiment of the invention, the magnet or the receiver is connected in rotationally movable fashion to a drive shaft, by preference to the drive shaft of the adjusting element that is to be actuated. This ensures that the setting can be measured directly.

In a refinement of the invention, provision is made for connecting the drive shaft to a gear train, and for the motion of the adjusting element to be transferred via the gear train to the drive shaft in either geared-down (i.e. gear train provides a gear ratio greater than one) or geared-up (i.e. gear train provides a gear ratio less than one) fashion. The result of gearing down or up is that the measurement range of absolute-measurement sensors of this kind is fully exploited.

In a further embodiment of the invention, the rotation of the drive shaft is to be limited. This ensures that the sensor is not brought into an undefined position.

In a refinement of the invention, the magnet or the receiver is arranged on a carriage. With an arrangement of this kind, a linear motion of the driven element is ascertained with the sensor.

In a refinement of the invention, provision is made to equip the microscope with a zoom system to modify the magnification, and with a system for adjusting the focus, a respective sensor being associated with the zoom and/or with the focus system. The magnification-related data, for example, can then be ascertained from the position of the zoom system, so that said data can then be stored for documentation purposes or else stored together with the image and/or image-acquisition data of an electronic image acquisition device, for example an electronic camera having a CCD imaging chip. Because the image data, image-acquisition data, and microscope data are stored in combination, the respective settings can be reapplied at a later point in time.

In a further embodiment of the invention, the sensor is connected to a control device and/or to an indicating device. The control device is connected via an active interface to a downstream storage device and/or to an image processing device. The indicating device serves here to visualize the value that is set, for example so that a specific adjustment position can be returned to.

In a preferred embodiment of the invention, the sensor has associated with it an active interface that is embodied, for example, as a USB or FireWire interface and enables data transfer simultaneously with power supply to the sensor. No additional power supply is therefore necessary in the microscope, and the sensor can be connected directly to the control device, for example to a conventional computer.

In an advantageous embodiment of the invention, the sensor operating in non-contact fashion is embodied as a Hall effect sensor, which is used in an optical device, preferably in a microscope that is to be operated manually and functions exclusively mechanically, to determine the position of the mechanically functioning adjusting element.

In a further embodiment of the invention, the Hall effect sensor is used in a zoom microscope to calibrate and/or store magnification data.

The use of such a sensor is particularly advantageous whenever the components of the microscope that are provided for displacement are moved in exclusively mechanical fashion, i.e. no electric-motor drives and corresponding control devices are present in order to ascertain position, and the exact position of the component must nevertheless be ascertained.

BRIEF DESCRIPTION OF THE DRAWINGS

The invention will be explained further with reference to an exemplifying embodiment, with the aid of schematic drawings in which:

FIG. 2 schematically depicts the sensor on the adjustable microscope element; and FIG. 3 shows a detail of FIG. 2 with the sensor.

DETAILED DESCRIPTION OF THE INVENTION

Figure 1:
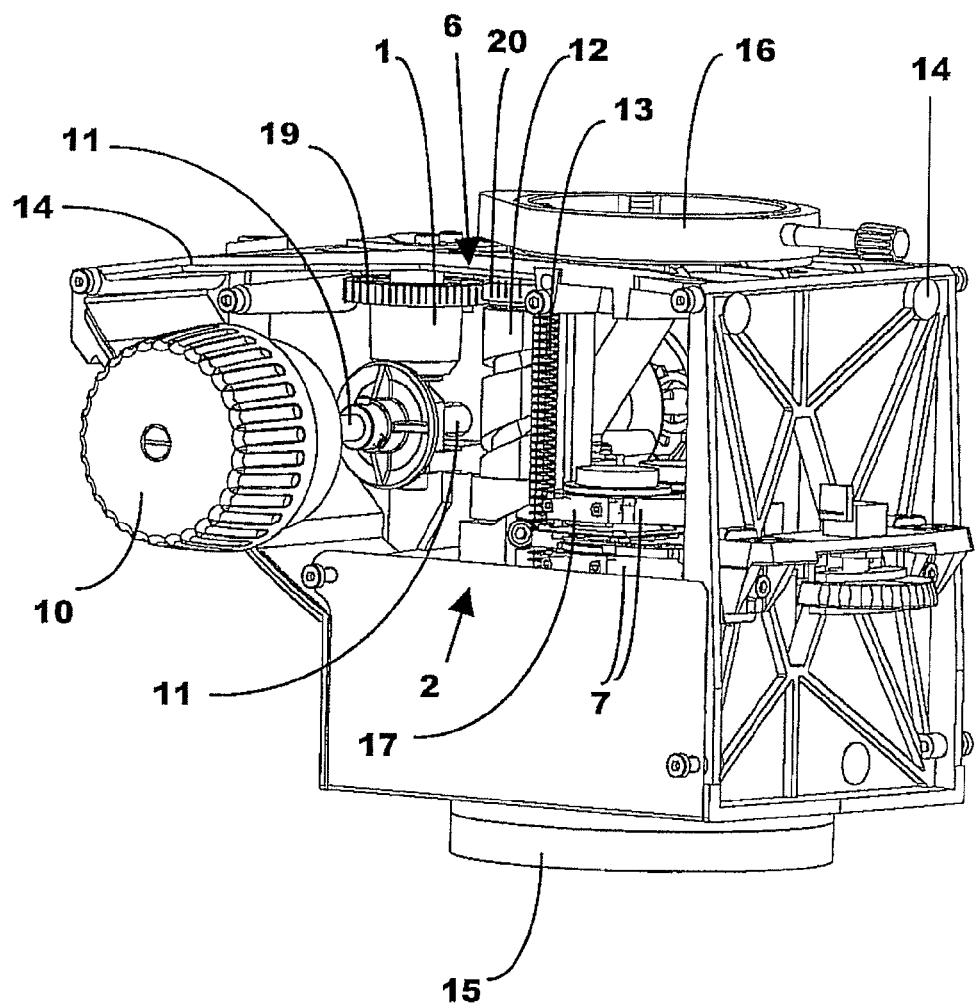
FIG. 1 is a view of an optics housing in a microscope having a zoom system, wherein the optics housing contains movable elements of the zoom system.

FIG. 1 shows optics housing 14 of a microscope (not depicted in further detail) having a main objective 15, a zoom system 7 arranged in optics housing 14, and a connector fitting 16 for an observation tube (not depicted). Also provided in optics housing 14 is an adjusting element 2 for modifying the position of zoom system 7. This adjusting element 2 encompasses a control knob 10 and a shaft 11, connected to control knob 10, that is associated with a spindle 12 and is in turn mechanically connected to zoom system 7. Zoom system 7 comprises a carriage 17 that is mechanically connected to spindle 12. In order to eliminate mechanical play, carriage 17 is connected to a spring 13 that is mounted on the other side on optics housing 14.

The rotary motion at control knob 10 is transferred via shaft 11 to spindle 12. Transfer of rotary motion from shaft 11 to spindle 12 (not shown in FIG. 1) may be achieved using known elements for transferring rotary motion, including for example bevel gears, spur gears, work gears, drive belts, and drive chains. Carriage 17 for zoom system 7 is moved along the extension of spring 13 by a rotation of spindle 12, and a manual adjustment of the microscope's magnification is thereby performed.

Spindle 12 is preferably configured in such a way that a spindle motion results in a logarithmic change in magnification. The result of this is that, for example, a spindle rotation of 10 degrees changes the magnification provided by zoom 7 by a fixed factor regardless of the angular position of spindle 12. With a spindle rotation of 720 degrees, for example, a total magnification factor of 16× can be set.

Additionally arranged in optics housing 14 is a sensor 1 that is connected to a drive shaft 5. Drive shaft 5 carries a pinion 19 of a gear train 6. Associated oppositely with pinion 19 is a further pinion 20 that is connected to spindle 12. Pinions 19, 20 are equipped with different diameters and form gear train 6. With this configuration, the rotary motion at control knob 10 is transferred via shaft 11 and gear train 6 to drive shaft 5 and to sensor 1. The position of the manually movable adjusting element 2 can thus be ascertained by sensor 1. A sensor that exhibits these features is offered, for example, by the company styled Austriamicrosystems AG, Austria, under the model number AS 5045. This sensor is also notable for the fact that it is an absolute-measurement sensor, in which the rotation axis can perform and is limited to a 360-degree motion and each angular position is reproducibly indicated or measured within this range.

A further result of this arrangement is that any mechanical play at control knob 10 and/or at shaft 11 has no effect on the measurement of sensor 1.

It is of course within the scope of the invention to arrange a linear encoder with Hall effect sensor on carriage 17 and optics housing 14, and to measure the linear motion of the carriage. One such linear encoder with Hall effect sensor is depicted and described in the document Electronik Praxis no. 12, Jun. 16, 2006, page 26. This sensor comprises multiple two-pole magnets arranged next to one another, which are moved linearly over the receiver module. In a context of smaller linear motions it is of course also possible to arrange only a single two-pole magnet.

FIG. 2 schematically shows optics housing 14 with gear train 6 and a drive shaft 5 arranged therein. Sensor 1 comprises a magnet 3 arranged on drive shaft 5. Associated oppositely with magnet 3 is a receiver 4 that is fixedly connected to optics housing 14.

FIG. 3 shows a detail of FIG. 2 with magnet 3, which is embodied here as a simple dipole (North-South). The field strength of magnet 3, which strength changes as magnet 3 is rotated by shaft 5, is measured with the oppositely located receiver 4. Associated with receiver 4 is an active interface 18 that connects sensor 1 and receiver 4 to a downstream control device 8 and to an indicating device 9. Interface 18 is embodied as an active interface, e.g. as USB or FireWire, and simultaneously supplies power to sensor 1 including receiver 4. Control device 8 may be a conventional computer having storage memory 21 and image processing capability, or storage and image processing may be provided by units (not shown) separate from control device 8.

PARTS LIST

1 Sensor
2 Adjusting element
3 Magnet
4 Receiver
5 Drive shaft
6 Gear train
7 Zoom system
8 Control device
9 Indicating device
10 Control knob
11 Shaft
12 Spindle
13 Spring
14 Optics housing
15 Main objective
16 Connector fitting
17 Carriage
18 Active interface
19 Pinion of 3
20 Pinion of 12
21 Storage device

What is claimed is:

1. A microscope comprising:
a mechanically adjustable zoom system for adjusting zoom of the microscope, the mechanically adjustable zoom system including at least one manually movable adjusting element actuated by a user to adjust a setting of the mechanically adjustable zoom system; and
a sensor associated with the adjusting element for ascertaining the position of the adjusting element, wherein the sensor is an absolute-measuring sensor operating in non-contact fashion and includes a first portion moving in response to movement of the adjusting element and a second portion remaining fixed, the first and second portions being non-contacting portions with respect to one another, wherein one of the first portion and the second portion is a magnet generating a magnetic field and the other of the first portion and the second portion is a receiver that senses change in the magnetic field.

2. The microscope according to claim 1, wherein the sensor is a Hall effect sensor.

3. The microscope according to claim 1, wherein the microscope further includes a rotatable drive shaft responsive to movement of the adjusting element, and the magnet or the receiver of the sensor is arranged on the drive shaft to rotate with the drive shaft.

4. The microscope according to claim 3, wherein the drive shaft is connected to a gear train, and motion of the adjusting element is transferred via the gear train to the drive shaft.

5. The microscope according to claim 4, wherein the gear train provides a gear ratio less than one.

6. The microscope according to claim 4, wherein the gear train provides a gear ratio greater than one.

7. The microscope according to claim 3, wherein rotation of the drive shaft is limited to 360 degrees.

8. The microscope according to claim 1, further comprising at least one auxiliary device and an active interface for connecting the sensor to the at least one auxiliary device.

9. The microscope according to claim 8, wherein the at least one auxiliary device includes a control device.

10. The microscope according to claim 8, wherein the at least one auxiliary device includes an indicating device.

11. The microscope according to claim 8, wherein the active interface is a universal serial bus (USB) interface.

12. The microscope according to claim 8, wherein the active interface is a FireWire interface.

13. The microscope according to claim 8, wherein the active interface provides power to the sensor.

14. In a microscope comprising a mechanically adjustable zoom system having a manually movable adjusting element actuated by a user to adjust a setting of the mechanically adjustable zoom system, the improvement comprising:
a Hall effect sensor arranged to measure an absolute position of the adjusting element of the mechanically adjustable zoom system.

15. The improvement according to claim 14, wherein the improvement further comprises:
a storage device connected to the Hall effect sensor, the storage device is used for storage of magnification data.

* * * * *